(12) United States Patent
Ohki (10) Patent No.: US 11,250,403 B2
(45) Date of Patent: Feb. 15, 2022

(54) ID-POS INFORMATION GENERATION SERVER, INFORMATION PROCESSING SYSTEM, ID-POS INFORMATION GENERATION METHOD, AND RECORDING MEDIUM

(71) Applicant: KONICA MINOLTA, INC., Tokyo (JP)

(72) Inventor: Kenichiro Ohki, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/943,194

(22) Filed: Jul. 30, 2020

(65) Prior Publication Data
US 2021/0035081 A1    Feb. 4, 2021

(30) Foreign Application Priority Data
Jul. 30, 2019    (JP) .............................. JP2019-139932

(51) Int. Cl.
G06Q 20/20    (2012.01)
(52) U.S. Cl.
CPC ................. *G06Q 20/202* (2013.01)
(58) Field of Classification Search
None
See application file for complete search history.

(56) References Cited

U.S. PATENT DOCUMENTS

| 7,155,405 | B2* | 12/2006 | Petrovich | G06Q 20/327 |
| | | | | 705/26.61 |
| 8,768,838 | B1* | 7/2014 | Hoffman | G06Q 40/00 |
| | | | | 705/44 |
| 9,286,603 | B2* | 3/2016 | Fung | G06Q 30/02 |
| 2002/0002485 | A1* | 1/2002 | O'Brien | G07G 5/00 |
| | | | | 705/14.25 |
| 2003/0055727 | A1* | 3/2003 | Walker | G06Q 30/0238 |
| | | | | 705/14.17 |
| 2003/0163427 | A1* | 8/2003 | Fung | G06Q 30/02 |
| | | | | 705/51 |

(Continued)

FOREIGN PATENT DOCUMENTS

JP    2018101442 A    6/2018

*Primary Examiner* — Fateh M Obaid
(74) *Attorney, Agent, or Firm* — Buchanan Ingersoll & Rooney PC (57) ABSTRACT

An ID-POS information generation server communicates with a POS terminal installed in a predetermined facility and a user terminal carried by a user in the facility, and includes: a POS installation information storage; a user information storage; and a hardware processor. The hardware processor: obtains POS information and stores the POS information in a POS history information storage; obtains activity information and stores the activity information in an activity history information storage; and generates ID-POS information by identifying the user identification information corresponding to the POS information and adding the identified user identification information to the POS information, based on the POS installation position information and the date and time information corresponding to the POS terminal identification information included in the POS information and the user position information and the date and time information included in the activity information.

10 Claims, 5 Drawing Sheets

(56) References Cited

U.S. PATENT DOCUMENTS

| | | | |
|---|---|---|---|
| 2003/0233279 A1* | 12/2003 | Shinzaki | G06Q 20/04 705/21 |
| 2011/0060631 A1* | 3/2011 | Grossman | G06Q 30/0238 705/14.13 |
| 2013/0006708 A1* | 1/2013 | Lee | G06Q 30/0201 705/7.29 |
| 2015/0206128 A1* | 7/2015 | Torossian | G06Q 20/327 705/21 |
| 2016/0005029 A1* | 1/2016 | Ivey | G06Q 20/409 705/44 |
| 2016/0012445 A1* | 1/2016 | Villa-Real | G06Q 20/353 705/44 |
| 2016/0071115 A1* | 3/2016 | Oh | G06Q 30/0201 705/7.29 |
| 2017/0098264 A1* | 4/2017 | Priebatsch | G06Q 20/3224 |
| 2019/0066087 A1* | 2/2019 | Shayovitz | G06Q 20/3224 |

* cited by examiner

ID-POS INFORMATION GENERATION SERVER, INFORMATION PROCESSING SYSTEM, ID-POS INFORMATION GENERATION METHOD, AND RECORDING MEDIUM

CROSS-REFERENCE TO RELATED APPLICATIONS

The entire disclosure of Japanese Patent Application No. 2019-139932 filed on Jul. 30, 2019 is incorporated herein by reference in its entirety.

BACKGROUND

Technological Field

The present invention relates to an ID-POS information generation server, an information processing system, an ID-POS information generation method, and a recording medium.

Description of the Related Art

There is a technique called ID-POS. ID-POS information is POS (Point Of Sale) information accompanied by an ID of a purchaser, and can identify the purchaser. To be specific, the ID-POS information is data indicating the "item, time, amount, price and purchaser of the purchase".

There has been known a technique for providing a product or service which is optimum for the user by collecting the above ID-POS information and analyzing the attribute and purchase action of the user.

For example, JP 2018-101442 A discloses a store support system which attempts to promote the purchase of products by providing sales information appropriate for the customer coming to the store on the basis of the purchase history and the like of the customer.

SUMMARY

However, the information processing system using the ID-POS has had a problem that the ID-POS information cannot be generated when a membership card for identifying the user as a member of the service is not held up and when the payment method capable of identifying the user as the member is not used.

The present invention has been made in consideration of the above matters, and an object of the present invention is to enable the generation of ID-POS information irrespective of the payment method and whether there is the membership card.

To achieve at least one of the abovementioned objects, according to an aspect of the present invention, an ID-POS information generation server reflecting one aspect of the present invention is an ID-POS information generation server that communicates with a POS terminal which is installed in a predetermined facility and a user terminal which is carried by a user in the facility, the ID-POS information generation server including: a POS installation information storage in which POS installation information is stored, the POS installation information including POS terminal identification information for uniquely identifying the POS terminal and POS installation position information indicating an installation position of the POS terminal; a user information storage in which user information is stored, the user information including user identification information for uniquely identifying the user that uses the user terminal and attribute information of the user; and a hardware processor that: obtains POS information and stores the POS information in a POS history information storage, the POS information being transmitted from the POS terminal when payment is performed by the POS terminal, and the POS information including the POS terminal identification information of the POS terminal and purchase information and date and time information of a product or a service that is purchased; obtains activity information and stores the activity information in an activity history information storage, the activity information including the user identification information of the user of the user terminal, user position information indicating a position of the user and date and time information; and generates ID-POS information by identifying the user identification information corresponding to the POS information and adding the identified user identification information to the POS information, based on the POS installation position information and the date and time information corresponding to the POS terminal identification information included in the POS information stored in the POS history information storage and the user position information and the date and time information included in the activity information stored in the activity history information storage.

To achieve at least one of the abovementioned objects, according to another aspect of the present invention, an information processing system reflecting one aspect of the present invention is an information processing system including: the ID-POS information generation server; the POS terminal that is installed in the predetermined facility; and the user terminal that is carried by the user in the facility.

To achieve at least one of the abovementioned objects, according to another aspect of the present invention, an ID-POS information generation method reflecting one aspect of the present invention is an ID-POS information generation method in an ID-POS information generation server that communicates with a POS terminal which is installed in a predetermined facility and a user terminal which is carried by a user in the facility, and the ID-POS information generation server including: a POS installation information storage in which POS installation information is stored, the POS installation information including POS terminal identification information for uniquely identifying the POS terminal and POS installation position information indicating an installation position of the POS terminal; and a user information storage in which user information is stored, the user information including user identification information for uniquely identifying the user that uses the user terminal and attribute information of the user, and the method including: obtaining POS information and storing the POS information in a POS history information storage, the POS information being transmitted from the POS terminal when payment is performed by the POS terminal, and the POS information including the POS terminal identification information of the POS terminal and purchase information and date and time information of a product or a service that is purchased; obtaining activity information and storing the activity information in an activity history information storage, the activity information including the user identification information of the user of the user terminal, user position information indicating a position of the user and date and time information; and generating ID-POS information by identifying the user identification information corresponding to the POS information and adding the identified user identification information to the POS information, based on the POS installation position information and the date and time information corresponding to the POS terminal identification information included in the POS information stored in the POS history information storage and the user position information and the date and time information included in the activity information stored in the activity history information storage.

To achieve at least one of the abovementioned objects, according to another aspect of the present invention, a recording medium reflecting one aspect of the present invention is a non-transitory recording medium storing a computer readable program causing a computer to function as an ID-POS information generation server that communicates with a POS terminal which is installed in a predetermined facility and a user terminal which is carried by a user in the facility, and the ID-POS information generation server including: a POS installation information storage in which POS installation information is stored, the POS installation information including POS terminal identification information for uniquely identifying the POS terminal and POS installation position information indicating an installation position of the POS terminal; and a user information storage in which user information is stored, the user information including user identification information for uniquely identifying the user that uses the user terminal and attribute information of the user, the program causing the computer to perform: obtaining POS information and storing the POS information in a POS history information storage, the POS information being transmitted from the POS terminal when payment is performed by the POS terminal, and the POS information including the POS terminal identification information of the POS terminal and purchase information and date and time information of a product or a service that is purchased; obtaining activity information and storing the activity information in an activity history information storage, the activity information including the user identification information of the user of the user terminal, user position information indicating a position of the user and date and time information; and generating ID-POS information by identifying the user identification information corresponding to the POS information and adding the identified user identification information to the POS information, based on the POS installation position information and the date and time information corresponding to the POS terminal identification information included in the POS information stored in the POS history information storage and the user position information and the date and time information included in the activity information stored in the activity history information storage.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the disclosed embodiments.

(Configuration of Information Processing System 100)

First, the configuration of an embodiment of the present invention will be described.

Figure 1:
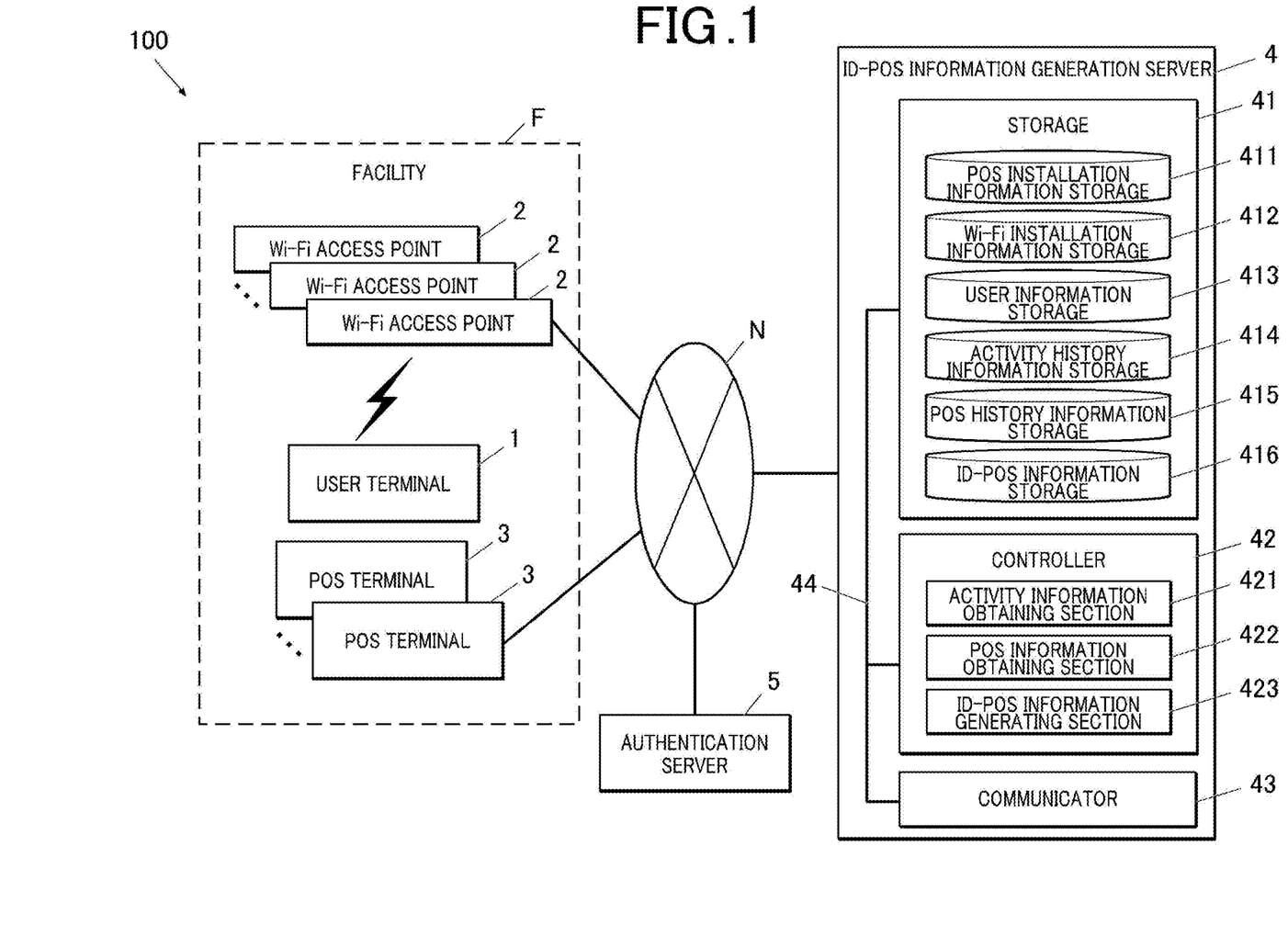
FIG. 1 is a diagram showing an entire configuration example of an information processing system in an embodiment of the present invention.

FIG. 1 shows the entire configuration example of an information processing system 100 in the present embodiment.

As shown in FIG. 1, the information processing system 100 is configured by including: a user terminal 1 carried by a user visiting a facility F such as a store; Wi-Fi access points 2 that are installed in the facility F; POS terminals 3 that are installed in the facility F; an ID-POS information generation server 4; and an authentication server 5. The user terminal 1 can be connected to the internet N via a Wi-Fi access point 2 or the like and communicate with the ID-POS information generation server 4. The POS terminal 3 can be connected to the internet N via a router or the like not shown in the drawings in a wired or wireless manner, and communicate with the ID-POS information generation server 4.

The number of each of the user terminal(s) 1, Wi-Fi access points 2 and the POS terminals 3 is not particularly limited.

The user terminal 1 is, for example, an information processing terminal such as a smartphone, a tablet terminal and a PC.

Figure 2:
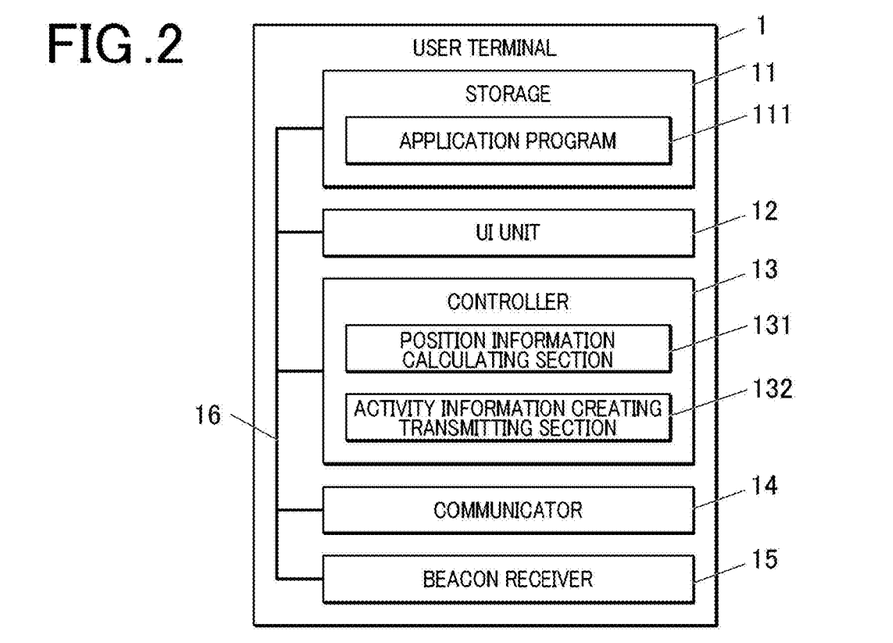
FIG. 2 is a block diagram showing the functional configuration of a user terminal of FIG. 1.

FIG. 2 is a block diagram showing the functional configuration of the user terminal 1.

As shown in FIG. 2, the user terminal 1 is configured by including a storage 11, a UI unit 12, a controller 13, a communicator 14, and a beacon receiver 15, and these components are connected to each other via a bus 16.

The storage 11 is configured by including a semiconductor memory, an HDD (Hard Disk Drive) or the like. The operating system of user terminal 1, programs for the controller 13 to execute various types of processing, parameters necessary for executing these programs, files and the like are stored in the storage 11.

In the present embodiment, an application program 111 (hereinafter, referred to as an application 111) for using the ID-POS information generation service provided by the ID-POS information generation server 4 is stored in the storage 11.

The user ID (U-ID), password and the like indicating the user who is registered as a member of the communication service using the Wi-Fi access point 2 are stored in the storage 11.

The UI (User Interface) unit 12 includes: a display configured by including an LCD (Liquid Crystal Display) or the like; and a touch panel having transparent electrodes which are arranged in a grid pattern such that the electrodes cover the surface of the display. The UI unit 12 detects the position pressed by a finger, a touch pen or the like, and outputs the positional information as operation information to the controller 13.

The controller 13 is configured by including a CPU (Central Processing Unit), a RAM (Random Access Memory), and the like, and integrally controls the operations of the components of user terminal 1. The controller 13 reads out the application 111 stored in the storage 11, loads the application 111 to the RAM, in accordance with the program, executes the processing on the user terminal 1 side (processing to be performed by the user terminal 1) in after-mentioned activity history information registration processing, and achieves the functions as a position information calculating section 131 that calculates the position of the user of the user terminal 1 and as an activity information creating transmitting section 132 that creates activity information and transmits the activity information to the ID-POS information generation server 4.

The communicator 14 is configured by including an NIC (Network Interface Card), a wireless LAN adaptor, and the like, and performs data transmission/reception with external devices connected via the internet N.

The Wi-Fi access point 2 connects a terminal device such as the user terminal 1 to the internet N via a router not shown in the drawings. The Wi-Fi access point 2 is an access point of a communication service available to the user registered as a member. Each Wi-Fi access point 2 is provided with a Wi-Fi number as identification information for uniquely identifying the Wi-Fi access point 2.

The POS terminal 3 is a terminal that registers POS information (see FIG. 7) when the product or service was purchased.

Each POS terminal 3 is provided with a POS number as POS terminal identification information for uniquely identifying the POS terminal 3. A geofence is set for each POS terminal 3. Each geofence is provided with a geofence number which is a unique identification information. A beacon transmitter is provided in or near each POS terminal 3, and the beacon transmitter transmits the geofence number of the POS terminal 3 to the user terminal 1 which enters the geofence of the POS terminal 3.

The ID-POS information generation server 4 is a server device which generates ID-POS information. As shown in FIG. 1, the ID-POS information generation server 4 is configured by including a storage 41, a controller 42 (hardware processor), a communicator 43, and the like, and the components are connected to each other via a bus 44.

The storage 41 is configured by including an HDD (Hard Disk Drive), a semiconductor memory or the like. The operating system of the ID-POS information generation server 4, programs for the controller 41 to perform various types of processing, parameters necessary for executing the programs, files and the like are stored in the storage 41.

In the present embodiment, a POS installation information storage 411, a Wi-Fi installation information storage 412, a user information storage 413, an activity history information storage 414, a POS history information storage 415, and an ID-POS information storage 416 are provided in the storage 41.

Figure 3:
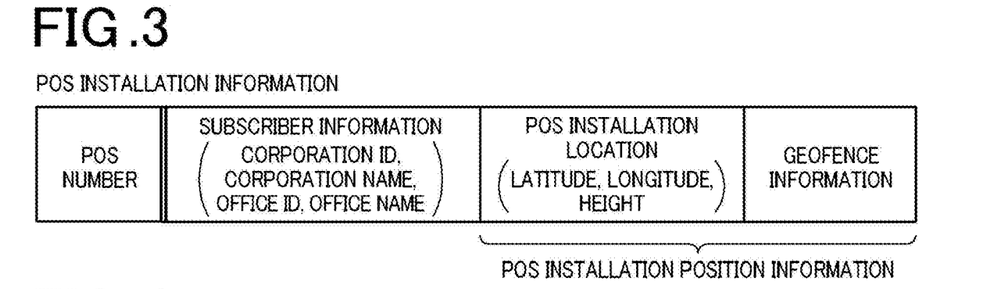
FIG. 3 is a view showing a data configuration example of POS installation information.

In the POS installation information storage 411, installation information of each POS terminal 3 which was installed in the facility F (POS installation information) is stored. As shown in FIG. 3, the POS installation information is information configured by including a POS number, subscriber information (corporation ID, corporation name, office ID, office name, or the like of a corporation (facility) contracting to install the POS terminal 3), POS installation position information (installation location (latitude, longitude, height, and geofence information of the POS terminal 3), and the like.

Figure 4:
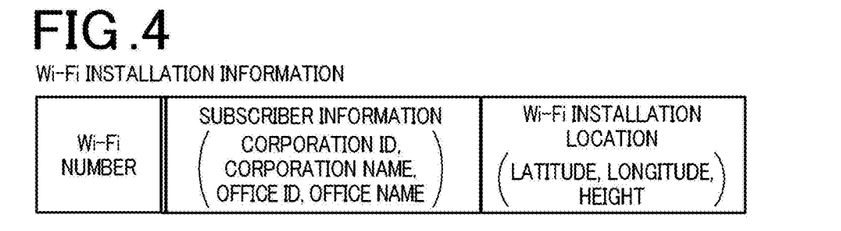
FIG. 4 is a view showing a data configuration example of Wi-Fi installation information.

In the Wi-Fi installation information storage 412, installation information (Wi-Fi installation information) of each Wi-Fi access point 2 which was installed in the facility F is stored. As shown in FIG. 4, the Wi-Fi installation information is information configured by including a Wi-Fi number, subscriber information (corporation ID, corporation name, office ID, office name, or the like of a corporation (facility) contracting to install the Wi-Fi access point 2), the installation location (latitude, longitude, height) of the Wi-Fi access point 2, and the like.

Figure 5:
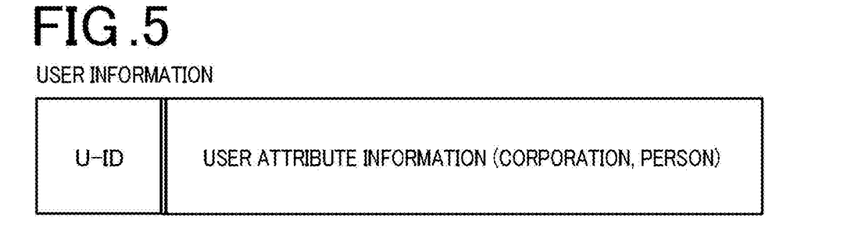
FIG. 5 is a view showing a data configuration example of user information.

In the user information storage 413, user information (Wi-Fi user information) of a membership communication service using the Wi-Fi access point 2 is stored. As shown in FIG. 5, the Wi-Fi user information is information configured by including a U-ID, user attribute information and the like. The U-ID is information which enables to uniquely identify the user of the above communication service. The user attribute information is the name, address, phone number, or the like of the user (corporation or person) of the above communication service.

Figure 6:
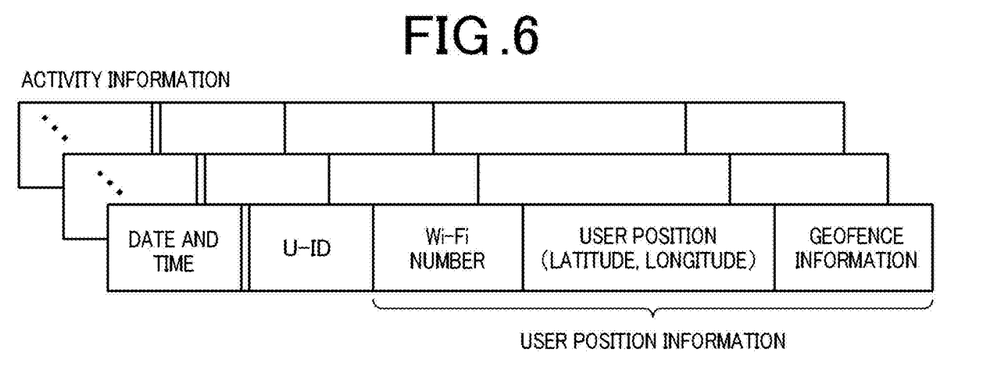
FIG. 6 is a view showing a data configuration example of activity information.

In the activity history information storage 414, the history of activity information in the facility F of the user of user terminal 1 is stored. As shown in FIG. 6, the activity information is information configured by including the date and time, U-ID, user position information (Wi-Fi number, user position (latitude, longitude), geofence information), and the like. The date and time is, for example, the transmission date and time of the activity information by the user terminal 1. Alternatively, the date and time may be the date and time when the user terminal 1 obtained the geofence information (or the user position when there is no geofence information). The U-ID is identification information for identifying the user of the user terminal 1 in the communication service using the Wi-Fi access point 2 (assigned to the user of the user terminal 1). The Wi-Fi number is the number of the Wi-Fi access point 2 which was used when the activity information was transmitted. The user position (latitude, longitude) is positional information calculated by the position information calculating section 131 of the user terminal 1 at the time of creation of the activity information. The position information calculating section 131 calculates the positional information of the user terminal 1 on the basis of the reception intensity of radio waves from the Wi-Fi access point 2, for example. The position information detected by the GPS may be used as the user position. The geofence information is the geofence number or the like which was transmitted from the beacon transmitter provided in or near the POS terminal 3 and was received by the user terminal 1 at the time of creation of the activity information. That is, the geofence information is information indicating that the user of the user terminal 1 exists in the geofence of the POS terminal 3 corresponding to the geofence information at the date and time included in the activity information.

Figure 7:
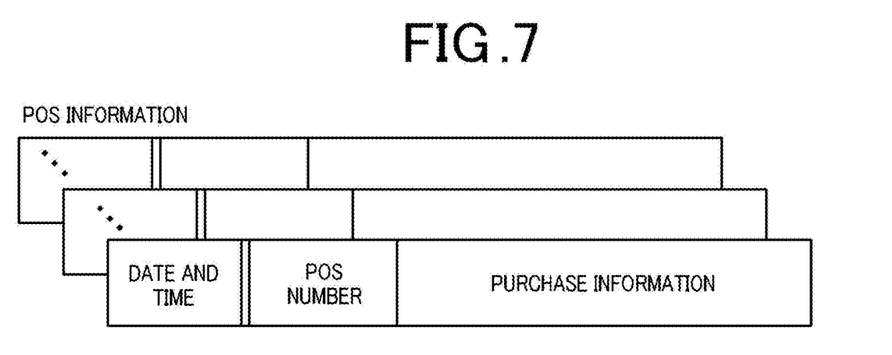
FIG. 7 is a view showing a data configuration example of POS information.

In the POS history information storage 415, the history of POS information generated when the product or service was purchased is stored. As shown in FIG. 7, the POS information is configured by including the date and time, POS number, purchase information, and the like. The date and time is the payment date and time of the purchased product or service. The date and time may be transmission date and time of the POS information by the POS terminal 3. The POS number is information for identifying the POS terminal 3. The purchase information is information including the product code (product name), price, number, and the like of the purchased product or service.

Figure 8:
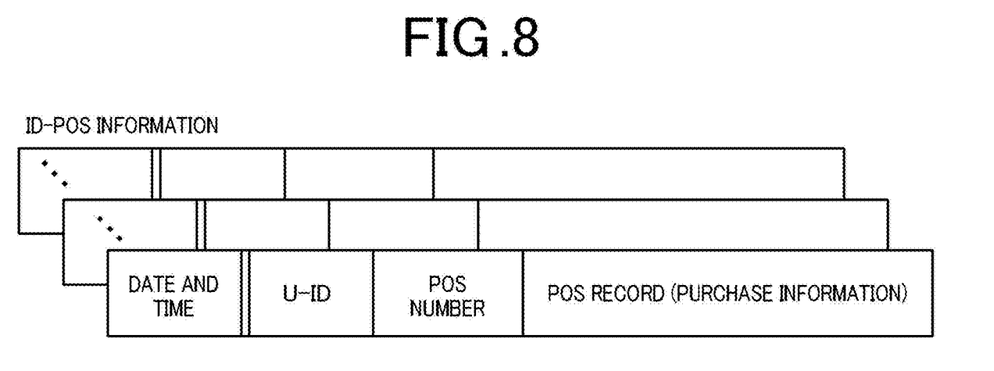
FIG. 8 is a view showing a data configuration example of ID-POS information.

In the ID-POS information storage 416, the ID-POS information (see FIG. 8) generated on the basis of the POS information stored in the POS history information storage 415 and the activity information stored in the activity history information storage 414 is stored.

The controller 42 is configured by including a CPU (Central Processing Unit), a RAM (Random Access Memory), and the like, and integrally controls the operations of components of the ID-POS information generation server 4. The controller 42 reads a program stored in the storage 41 and loads the program to the RAM. In accordance with the loaded program, the controller 42 executes processing to be performed on the ID-POS information generation server 4 side in the after-mentioned activity history information registration processing to achieve the function as the activity information obtaining section 421, executes the processing to be performed on the ID-POS information generation server 4 side in the POS history information registration processing to achieve the function as the POS information obtaining section 422, and executes the ID-POS information generation processing to achieve the function as the ID-POS information generating section 423.

The activity information obtaining section 421 obtains activity information which is transmitted from the user terminal 1 and stores the activity information in the activity history information storage 414. The POS information obtaining section 422 obtains the POS information which is transmitted from the POS terminal 3 and stores the POS information in the POS history information storage 415. On the basis of the POS installation position information and the date and time information corresponding to the POS number included in the POS information stored in the POS history information storage 415 and the user position information and the date and time information included in the activity information stored in the activity history information storage 414, the ID-POS information generating section 423 identifies the U-ID corresponding to the POS information and adds the U-ID to the POS information to generate the ID-POS information.

The communicator 43 is configured by including an NIC (Network Interface Card) and the like, and performs data transmission/reception with external devices connected via the internet N.

The authentication server 5 is a device which performs authentication of a user who is going to connect to the internet N via the Wi-Fi access point 2.

(Operation of Information Processing System 100)

Next, the operation of information processing system 100 will be described.

When the user terminal 1 enters the communicable area of any Wi-Fi access point 2, the controller 13 of the user terminal 1 requests authentication by transmitting the U-ID and password indicating that the user is a user registered as a member of the communication service using the Wi-Fi access point 2 to the Wi-Fi access point 2. The Wi-Fi access point 2 forwards the U-ID and password received from the user terminal 1 to the authentication server 5, and connects the user terminal 1 to the internet N when the authentication is obtained at the authentication server 5. As the authentication server 5, for example, a RADIUS (Remote Authentication Dial In User Service) server can be used. As the authentication method, for example, EAP-TTLS authentication can be used.

When the user of the user terminal 1 is authenticated as the user of the Wi-Fi access point 2, activity history information registration processing is performed between the user terminal 1 and the ID-POS information generation server 4.

Figure 9:
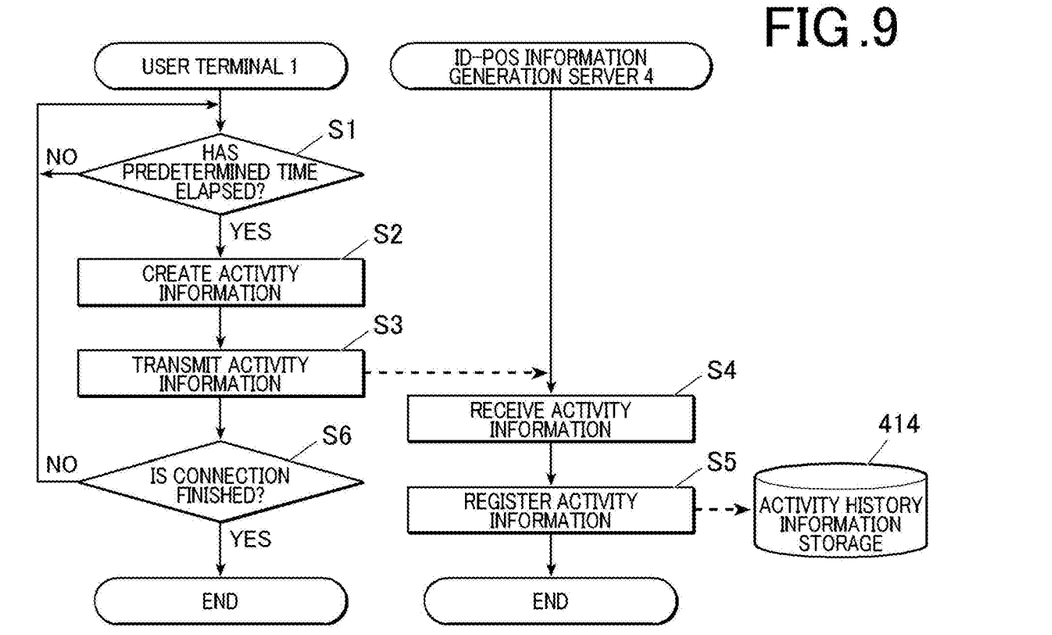
FIG. 9 is a ladder chart showing the flow of activity history information registration processing.

FIG. 9 is a ladder chart showing the activity history information registration processing performed between the user terminal 1 and the ID-POS information generation server 4. The processing on the user terminal 1 side of the activity history information registration processing is performed by cooperation between the controller 13 of user terminal 1 and the application 111. The processing on the ID-POS information generation server 4 side of the activity history information registration processing is performed by cooperation between the controller 42 and the program stored in the storage 41.

Hereinafter, the activity history information registration processing will be described.

First, the controller 13 of user terminal 1 determines whether a predetermined time (for example, N seconds, N>0) has elapsed. If the controller 13 determines that the predetermined time has elapsed (step S1; YES), the controller 13 creates activity information of the user of user terminal 1 (step S2).

In step S2, the controller 13 of the user terminal 1 creates the activity information which was explained by using FIG. 6. As the U-ID, the U-ID which was used for authentication at the communication service using the Wi-Fi access point 2 is used.

The geofence information is information which is received when the user terminal 1 (that is, user) is located in the geofence of any POS terminal 3. The geofence information is blank when the geofence information is not newly received (when the user is not located in the geofence of any POS terminal or the information could not be received successfully) after the previous activity information was created.

Next, the controller 13 transmits the generated activity information to the ID-POS information generation server 4 via the Wi-Fi access point 2 with the communicator 14 (step S3), and proceeds to step S6.

In the ID-POS information generation server 4, when the activity information transmitted from the user terminal 1 is received by the communicator 43 (step S4), the controller 42 obtains the received activity information and registers the obtained activity information in the activity history information storage 414 (step S5).

In step S6, the controller 13 determines whether the connection with the currently-connected Wi-Fi access point 2 is finished (step S6). When the user terminal 1 gets outside the area of the currently-connected Wi-Fi access point 2 due to the movement of user or the like, the connection between the user terminal 1 and the Wi-Fi access point 2 ends.

If the controller 13 determines that the connection with the currently-connected Wi-Fi access point 2 is not finished (step S6; NO), the controller 13 returns to step S. If the controller 13 determines that the connection with the currently-connected Wi-Fi access point 2 is finished (step S6; YES), the controller 13 ends the activity history information registration processing.

Next, the POS history information registration processing performed between the POS terminal 3 and the ID-POS information generation server 4 will be described.

Figure 10:
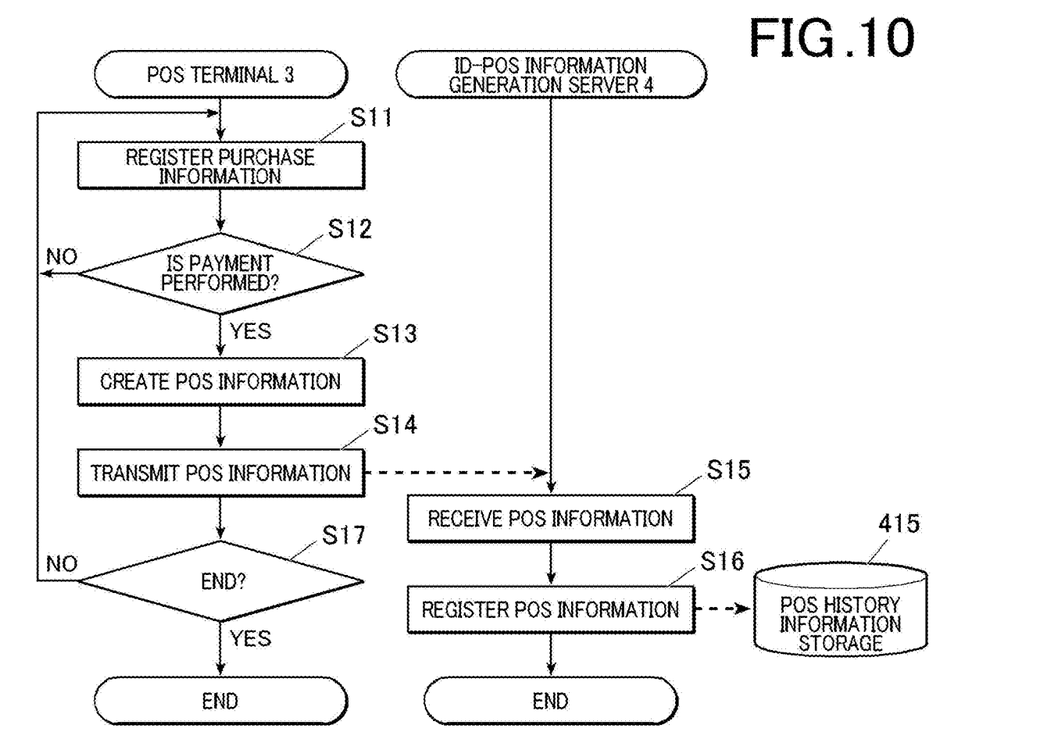
FIG. 10 is a ladder chart showing the flow of POS history information registration processing.

FIG. 10 is a ladder chart showing the flow of POS history information registration processing. The processing on the POS terminal 3 side of the POS history information registration processing is performed by the cooperation between the controller of the POS terminal 3 and the program. The processing on the ID-POS information generation server 4 side of the POS history information registration processing is performed by the cooperation between the controller 42 and the program stored in the storage 41.

When the purchase information of a product or service is registered (step S11) and payment for the registered product or service is performed (step S12; YES), the POS terminal 3 creates POS information (step S13). In step S13, the POS terminal 3 creates the POS information which was explained by using FIG. 7.

Next, the POS terminal 3 transmits the generated POS information to the ID-POS information generation server 4 (step S14), and proceeds to step S17.

In the ID-POS information generation server 4, when the POS information transmitted from the POS terminal 3 is received by the communicator 43 (step S15), the controller 42 obtains the received POS information and registers the obtained POS information in the POS history information storage 415 (step S16).

In step S17, the POS terminal 3 determines whether the instruction to end the registration of purchase information was input (step S17). If the POS terminal 3 determines that the instruction to end the registration of purchase information was not input (step S17; NO), the POS terminal 3 returns to step S11. If the POS terminal 3 determines that the instruction to end the registration of purchase information was input (step S17; YES), the POS terminal 3 ends the POS history information registration processing.

Next, ID-POS information generation processing performed in the ID-POS information generation server 4 will be described.

Figure 11:
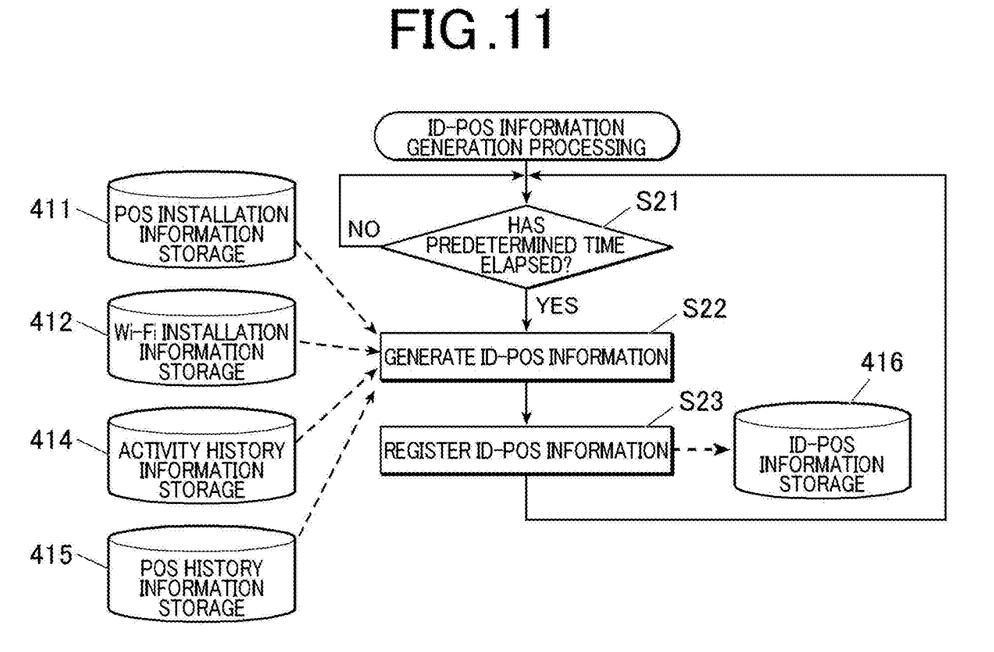
FIG. 11 is a flowchart showing the flow of ID-POS information generation processing.

FIG. 11 is a flowchart showing the flow of ID-POS information generation processing. The ID-POS information generation processing is, for example, performed by the cooperation between the controller 42 and the program stored in the storage 41 when the power of the ID-POS information generation server 4 is turned on.

First, the controller 42 determines whether a predetermined time (for example, one day) has elapsed (step S21). If the controller 42 determines that the predetermined time has elapsed (step S21; YES), the controller 42 generates the ID-POS information (step S22).

To be specific, the controller 42 generates the ID-POS information on the basis of the activity information stored in the activity history information storage 414, the POS information stored in the POS history information storage 415, the POS installation information stored in the POS installation information storage 411, the Wi-Fi installation information stored in the Wi-Fi installation information storage 412 and the like.

Figure 12:
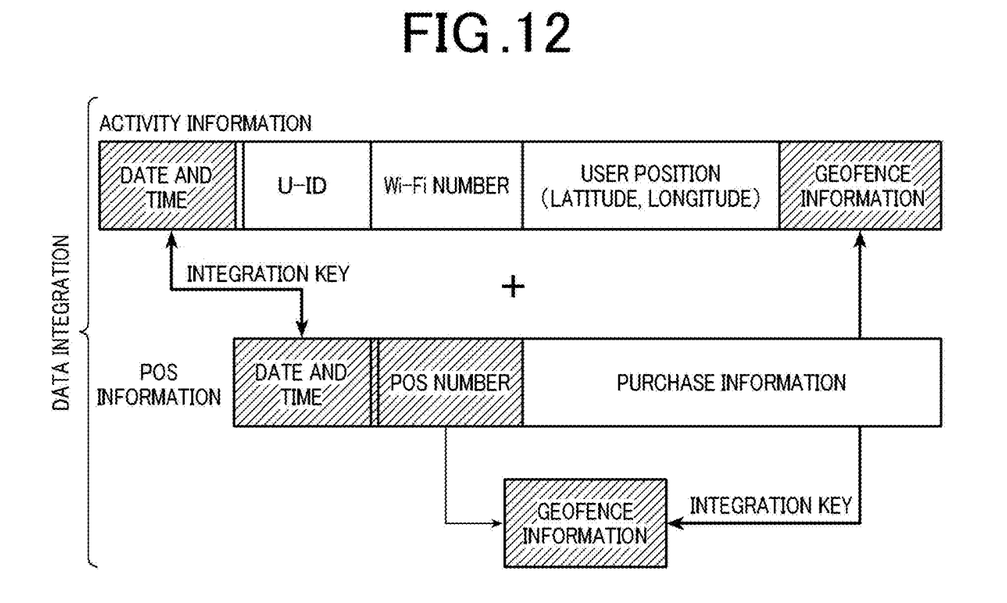
FIG. 12 is a view for explaining an example of the generation method of ID-POS information.

The user who performed the purchase corresponding to the POS information should have been located near the installation position (inside the geofence) of the POS terminal 3 corresponding to the POS number included in the POS information at the time of creation and transmission of the POS information. The controller 42 identifies the U-ID of the user corresponding to each piece of POS information on the basis of the date and time included in the POS information stored in the POS history information storage 415 and the POS installation position information of the POS terminal 3 corresponding to the POS number, and the date and time and the user position information included in the activity information stored in the activity history information storage 414. For example, as shown in FIG. 12, by using, as an integration key, the date and time and geofence information corresponding to the POS number included in the POS information and the date and time and geofence information included in the activity information, the controller 42 associates the activity information and the POS information for which the date and time and the geofence information match (nearly match) each other. The controller 42 identifies the U-ID of the activity information as the U-ID of the user corresponding to the POS information.

When the geofence information was not correctly received due to the defects of the device which transmits the geofence information, radio disturbance, or the like, and when the geofence information is not set, the installation location (latitude, longitude, height) of the POS terminal 3 corresponding to the POS number may be used as the POS installation position information and the user position (latitude, longitude) and Wi-Fi number may be used as the user position information to identify the U-ID of the user corresponding to each piece of POS information. For example, the height information of the Wi-Fi access point 2 corresponding to the Wi-Fi number included in the activity information may be obtained from the Wi-Fi installation information storage 412 and the obtained height may be identified as the height of the user position.

When the generation of ID-POS information is finished, the controller 42 registers the generated ID-POS information in the ID-POS information storage 416 (step S23). The controller 42 then returns to step S21, and repeatedly performs the steps S21 to S23.

In such a way, according to the information processing system 100, the U-ID of the user corresponding to the POS information can be identified by the date and time information and position information, and thus, it is possible to generate the ID-POS information irrespective of the payment method and whether there is the membership card.

According to the generated ID-POS information, it is possible to identify the user corresponding to the POS information by the U-ID. Thus, by using the ID-POS information registered in the ID-POS information storage 416, it is possible to deliver advertisement suitable for the user, reflect the purchase information of the user on household accounts, and perform automation of expense application in conjunction with the expense settlement system of a corporation when the user is the corporation.

Hereinafter, modification examples of the information processing system 100 in the above embodiment will be described.

Modification Example 1

The above embodiment has been described for an example in which the geofence information is the geofence number that is uniquely assigned to the POS terminal 3 and transmitted by the beacon transmitter which is provided in or near the POS terminal 3. However, the geofence information is not limited to this, and for example, beacon information (ID information) which is uniquely assigned to the beacon transmitter provided in or near the POS terminal 3 may be used. In this case, as the geofence information of the POS installation information of each POS terminal 3 in the POS installation information storage 411, the beacon information of the beacon transmitter which is provided in or near the terminal is registered. Then, in the activity history information registration processing, the user terminal 1 generates the activity information with the received beacon information as the geofence information, and transmits the generated activity information to the ID-POS information generation server 4. When the application 111 has an existing Beacon cooperative function (for example, iBeacon (registered trademark)), in accordance with the Beacon cooperative function, the activity information may be created and transmitted to the ID-POS information generation server 4. For example, the received beacon information, U-ID, date and time, and the like may be transmitted as the activity information to the ID-POS information generation server 4 when the user terminal 1 receives the beacon information, not each predetermined time shown in FIG. 9.

Modification Example 2

Though the above embodiment has been described for an example in which the geofence number which is uniquely assigned to the POS terminal 3 and transmitted by the beacon transmitter provided in or near the POS terminal 3 is the geofence information, the geofence information is not limited to this. For example, the radio intensity from a predetermined Wi-Fi access point 2 and the radio intensity from one or more fix devices (transmitters of beacon or sound) provided in the facility F or signal arrival time in the geofence of each POS terminal 3 may be the geofence information of the POS terminal 3. In this case, for example, as the geofence information included in the POS installation information of each POS terminal 3 of the POS installation information storage 411, the radio intensity from a predetermined Wi-Fi access point 2 and the radio intensity from one or more fix devices (transmitters of beacon or sound) provided in the facility F or signal arrival time in the geofence of the terminal is registered. In the activity history information registration processing, the user terminal 1 measures the radio intensity from the predetermined Wi-Fi access point 2 and the radio intensity from one or more fix devices (transmitters of beacon or sound) provided in the facility F or signal arrival time each predetermined time, and generates the activity information with the measurement results as the geofence information, and transmits the activity information to the ID-POS information generation server 4. Alternatively, as the geofence information of POS installation information of each POS terminal 3 in the POS installation information storage 411, the geofence number may be registered similarly to the above embodiment, and the correspondence relationship between the geofence number of each POS terminal 3 and the radio intensity from Wi-Fi access point 2 of the POS terminal 3 and the radio intensity from one or more fix devices (transmitters of beacon or sound) provided in the facility F or signal arrival time in the geofence of the POS terminal 3 may be held in the application 111 so that the geofence number is identified from the radio intensity from the predetermined Wi-Fi access point 2 and the radio intensity from one or more fix devices (transmitters of beacon or sound) provided in the facility F or the signal arrival time which the user terminal 1 measured, and the identified geofence number is set as the geofence information of the activity information.

Modification Example 3

In the above embodiment and modification examples 1 and 2, the geofence information is included in the POS installation position information and the user position information. However, when the facility F is so narrow that only a single POS terminal 3 is installed and only a single person can come in front of the POS terminal 3, the setting of geofence to the POS terminal 3 is not necessary since it is possible to identify the user who was closest to the POS installation position (that is, the user who performed the payment) at the date and time of the POS information even when the geofence information is not included in the POS installation position information and the user position information.

Modification Example 4

The above embodiment has been described by taking, as an example, a case where the height information of the user position is identified on the basis of the Wi-Fi number of activity information. However, the height information of user position may be obtained by using any known method in the user terminal 1 and the height information may be included together with the latitude and longitude in the user position of the activity information. When the geofence information is not included in the activity information, the installation location (latitude, longitude, height) of POS terminal 3 corresponding to the POS number may be used as the POS installation position information, and the user position (latitude, longitude, height) may be used as the user position information to identify the U-ID of the user corresponding to each piece of POS information.

Modification Example 5

In the above embodiment, the activity information and the POS information are associated with each other by using, as an integration key, the date and time and the geofence information corresponding to the POS number included in the POS information and the date and time and the geofence information included in the activity information. However, other integration keys may be used. For example, address information may be recorded in "subscriber information" in "POS installation information" and address information may be recorded as the installation location of Wi-Fi in "Wi-Fi installation information" so that the address information corresponding to "POS number" included in "POS information" and address information corresponding to "Wi-Fi number" included in "activity information" are used as an integration key when the "activity information" and the "POS information" are combined.

Modification Example 6

In the above embodiment, the application 111 in the user terminal 1 creates the activity information and transmits the activity information to the ID-POS information generation server 4. However, the authentication server 5 may record the authentication log (authentication date and time, U-ID, Wi-Fi number of the Wi-Fi access point used by the user) at the time of authentication so that the ID-POS information generation server 4 obtains the authentication log from the authentication server and records the authentication log as the activity information. In this case, the user position information in the activity information is the Wi-Fi installation location corresponding to the Wi-Fi number. The ID-POS information generation server 4 converts the Wi-Fi number into the corresponding Wi-Fi installation location to use the converted information as the user position information when using the user position information. At the time of recording the activity information, the Wi-Fi number may be converted into the Wi-Fi installation location and recorded.

In this case, it is not necessary to install any special application into the user terminal 1 since the user terminal 1 generally merely uses the standard Wi-Fi connection function which is loaded onto the terminal.

Modification Example 7

In the above embodiment and its modification examples, the activity information is created by using the U-ID which is uniquely assigned to the user of the user terminal 1 in the communication service using the Wi-Fi access point 2, and the ID-POS information is generated by using the activity information. However, in a configuration in which the user authentication is performed at the time of access to the ID-POS information generation server 4 by using the application 111, the U-ID may be set as the U-ID which is uniquely assigned to the user of the user terminal 1 at the time of using the application 111, the user attribute information may be the user attribute information of the user of the application 111, and the U-ID included in the activity information transmitted from the user terminal 1 in the activity history information registration processing may be set as the U-ID of the user of the application 111 which was assigned (used in the user authentication) to the user of the user terminal 1. When the ID-POS information is generated by using the U-ID of user information of the application 111, the communication method when the activity information is transmitted from the user terminal 1 to the ID-POS information generation server 4 in the activity history information registration processing is not limited to Wi-Fi, and for example, any other communication method such as 4G may be used.

As described above, the controller 42 of the ID-POS information generation server 4 obtains POS information and stores the POS information in the POS history information storage 415, the POS information being transmitted from the POS terminal 3 when payment is performed by the POS terminal 3 and the POS information including a POS number of the POS terminal 3 and purchase information and date and time information of a product or service that was purchased. The controller 42 also obtains activity information including the U-ID of the user of the user terminal, user position information indicating the position of the user and date and time information, and stores the activity information in the activity history information storage 414. On the basis of the POS installation position information and date and time information corresponding to the POS number included in the POS information stored in the POS history information storage 415 and the user position information and date and time information included in the activity information stored in the activity history information storage 414, the controller 42 identifies user identification information corresponding to the POS information and adds the identified user identification information to the POS information to generate the ID-POS information.

Accordingly, since the U-ID of the user corresponding to the POS information can be identified by the date and time information and the position information, it is possible to generate the ID-POS information irrespective of the payment method and whether there is the membership card.

It is not necessary to separately register the user information as long as the user is a member of the above communication service by using, as the U-ID, the U-ID of user information of the communication service by Wi-Fi which is more universal technical platform.

It is not necessary to separately register the user information by using, as the U-ID, the U-ID for uniquely identifying the user of the application program loaded onto the user terminal 1.

The POS installation position information includes geofence information for identifying the geofence which is set in advance for each of the POS terminals 3, and the user position information includes the geofence information of POS terminal 3 which was transmitted from the transmitter installed in or near the POS terminal 3 in the geofence of POS terminal 3 and received by the user terminal 1. Thus, it is possible to identify the position of user by the geofence information and easily identify the user even when POS terminals 3 are adjacent to each other in the facility.

The POS installation position information includes information on the latitude, longitude and height of the installation location of the POS terminal 3, and the user position information includes information which enables identifying the latitude, longitude and height of the position of the user of the user terminal 1. Thus, it is possible to identify the user in a facility in which geofence is not set to the POS terminal 3 or when the geofence information cannot be received by the user terminal 1. The height of position of the user of user terminal 1 can be identified on the basis of the height of the Wi-Fi access point 2.

The description of the above embodiment is a preferred example of a preferred information processing system according to the present invention, and the present invention is not limited to this.

For example, in the above embodiment, the ID-POS information generation server 4 is a single device. However, the ID-POS information generation server 4 does not need to be physically a single server, and may be arranged to be dispersed functionally.

The above embodiment has been described by taking, as an example, a case where the wireless communication access point for connecting the user terminal 1 to the internet N is set as the Wi-Fi access point 2 and the ID-POS information is generated by using the U-ID of the user of the communication service using the Wi-Fi access point 2. However, the access point for connecting the user terminal 1 to the internet N is not limited to the Wi-Fi access point. The access point for connecting the user terminal 1 to the internet N may be the access point of any other wireless communication method and the ID-POS information may be generated by using the U-ID of the user of the communication service using the access point of the any other wireless communication method.

The above description describes, as the computer readable medium of the program according to the present invention, examples using a hard disk or a semiconductor nonvolatile memory. However, the present invention is not limited to the above examples. A portable recording medium such as a CD-ROM can be applied as other computer readable medium. A carrier wave is also applied as the medium to provide data of the program according to the present invention through the communication lines.

The other detailed configuration and detailed operation of the devices included in the information processing system 100 can be suitably changed without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An ID-POS information generation server that communicates with a POS terminal which is installed in a predetermined facility and a user terminal, which is carried by a user in the facility, the ID-POS information generation server comprising:
   a POS installation information storage in which POS installation information is stored, the POS installation information including POS terminal identification information for uniquely identifying the POS terminal and POS installation position information indicating an installation position of the POS terminal;
   a user information storage in which user information is stored, the user information including user identification information for uniquely identifying the user that uses the user terminal and attribute information of the user; and
   a hardware processor that:
   obtains POS information and stores the POS information in a POS history information storage, the POS information being transmitted from the POS terminal when payment is performed by the POS terminal, and the POS information including the POS terminal identification information of the POS terminal and purchase information and date and time information of a product or a service that is purchased;
   obtains, from the user terminal, activity information and stores the activity information in an activity history information storage, the activity information including the user identification information of the user of the user terminal, user position information indicating a position of the user and date and time information; and
   generates ID-POS information by identifying correspondences between the user identification information and the POS information, wherein the correspondences are determined by correlating the POS installation position information and the date and time information corresponding to the POS terminal identification information included in the POS information stored in the POS history information storage and the user position information and the date and time information included in the activity information stored in the activity history information storage, and adding the identified user identification information to the POS information to generate the ID-POS information.

2. The ID-POS information generation server according to claim 1, wherein
   the user terminal communicates with the ID-POS information generation server via a wireless communication access point of a predetermined communication method that is installed in the facility, and
   the user identification information for uniquely identifying the user that uses the user terminal is user identification information for uniquely identifying a user of a communication service via the wireless communication access point, and the attribute information of the user is attribute information of the user of the communication service via the wireless communication access point.

3. The ID-POS information generation server according to claim 1, wherein the user identification information is user identification information for uniquely identifying a user of an application program that is loaded on the user terminal, and the attribute information of the user is attribute information of the user of the application program.

4. The ID-POS information generation server according to claim 1, wherein the POS installation position information includes geofence information for identifying geofence that is set in advance for each of the POS terminal, and
   the user position information includes the geofence information of the POS terminal, the geofence information being transmitted from a transmitter that is installed in or near the POS terminal in the geofence of the POS terminal and being received by the user terminal.

5. The ID-POS information generation server according to claim 1, wherein
   the POS installation position information includes information on a latitude, a longitude, and a height of an installation location of the POS terminal, and
   the user position information includes information that enables identification of a latitude, a longitude, and a height of the position of the user of the user terminal.

6. The ID-POS information generation server according to claim 5, further comprising an access point installation information storage in which identification information of a wireless communication access point that is installed in the facility and information on a latitude, a longitude, and a height of an installation location of the wireless communication access point are stored in association with each other, wherein
   the user position information includes the identification information of the wireless communication access point that is used in transmission of the activity information to the ID-POS information generation server, and
   the hardware processor identifies a height of the user terminal based on the information on the height that is stored in association with the identification information of the wireless communication access point included in the user position information in the access point installation information storage.

7. An information processing system comprising:
   the ID-POS information generation server according to claim 1;
   the POS terminal that is installed in the predetermined facility; and
   the user terminal that is carried by the user in the facility.

8. An ID-POS information generation method in an ID-POS information generation server that communicates with a POS terminal which is installed in a predetermined facility and a user terminal which is carried by a user in the facility, the ID-POS information generation server including:
   a POS installation information storage in which POS installation information is stored, the POS installation information including POS terminal identification information for uniquely identifying the POS terminal and POS installation position information indicating an installation position of the POS terminal; and
   a user information storage in which user information is stored, the user information including user identification information for uniquely identifying the user that uses the user terminal and attribute information of the user, and
   the method comprising:
   obtaining POS information and storing the POS information in a POS history information storage, the POS information being transmitted from the POS terminal when payment is performed by the POS terminal, and the POS information including the POS terminal identification information of the POS terminal and purchase information and date and time information of a product or a service that is purchased;

obtaining, from the user terminal, activity information and storing the activity information in an activity history information storage, the activity information including the user identification information of the user of the user terminal, user position information indicating a position of the user and date and time information; and generating ID-POS information by identifying correspondences between the user identification information and the POS information, wherein the correspondences are determined by correlating the POS installation position information and the date and time information corresponding to the POS terminal identification information included in the POS information stored in the POS history information storage and the user position information and the date and time information included in the activity information stored in the activity history information storage, and adding the identified user identification information to the POS information to generate the ID-POS information.

9. A non-transitory recording medium storing a computer readable program causing a computer to function as an ID-POS information generation server that communicates with a POS terminal which is installed in a predetermined facility and a user terminal which is carried by a user in the facility, the ID-POS information generation server including:

a POS installation information storage in which POS installation information is stored, the POS installation information including POS terminal identification information for uniquely identifying the POS terminal and POS installation position information indicating an installation position of the POS terminal; and a user information storage in which user information is stored, the user information including user identification information for uniquely identifying the user that uses the user terminal and attribute information of the user, and the program causing the computer to perform:

obtaining POS information and storing the POS information in a POS history information storage, the POS information being transmitted from the POS terminal when payment is performed by the POS terminal, and the POS information including the POS terminal identification information of the POS terminal and purchase information and date and time information of a product or a service that is purchased;

obtaining, from the user terminal, activity information and storing the activity information in an activity history information storage, the activity information including the user identification information of the user of the user terminal, user position information indicating a position of the user and date and time information; and generating ID-POS information by identifying correspondences between the user identification information and the POS information, wherein the correspondence are determined by correlating the POS installation position information and the date and time information corresponding to the POS terminal identification information included in the POS information stored in the POS history information storage and the user position information and the date and time information included in the activity information stored in the activity history information storage, and adding the identified user identification information to the POS information to generate the ID-POS information.

10. The ID-POS information generation server according to claim 1, wherein a payment method used for the purchase of the product or the service does not identify a user of the user device.

* * * * *